Figure 9:
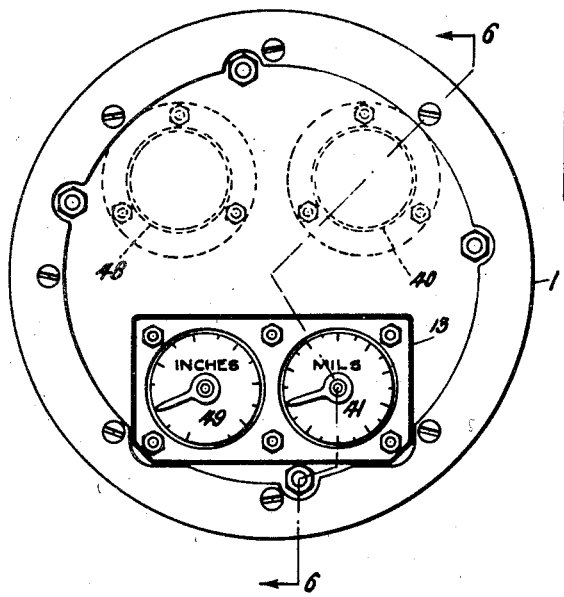

Sept. 5, 1950 W. H. JANSSEN ET AL 2,521,634
ACOUSTIC CHAMBER FOR ANALYSIS OF GASEOUS MIXTURES
Filed March 4, 1947 3 Sheets-Sheet 1
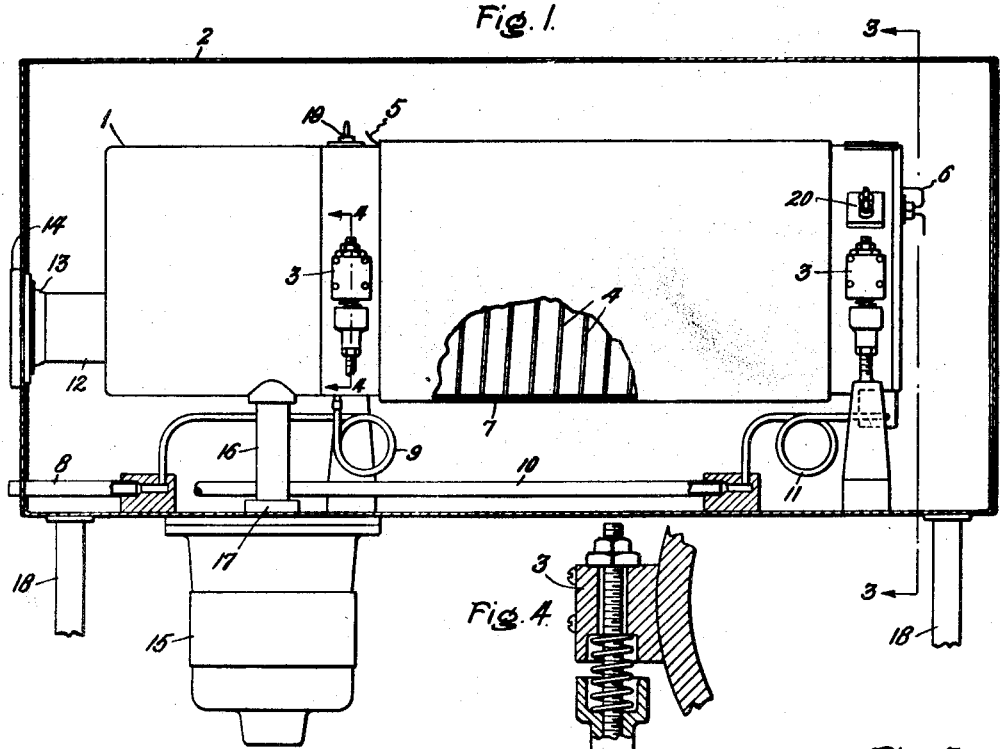
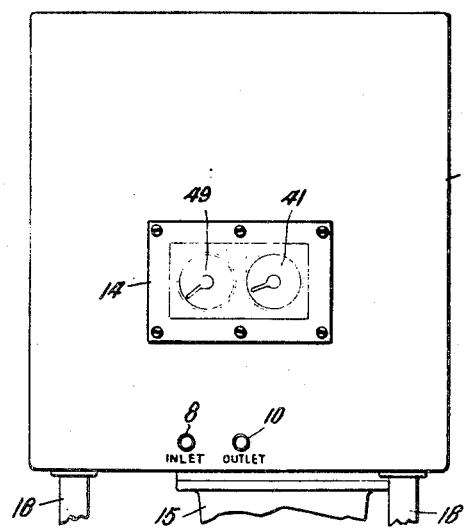
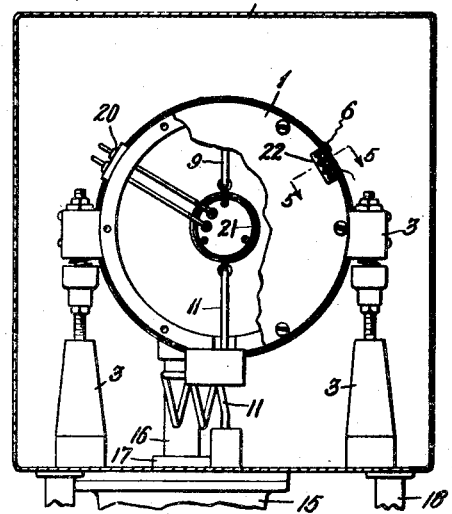
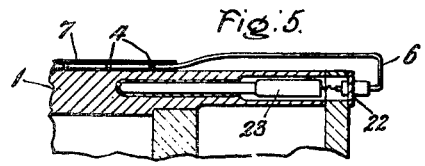
Inventors:
Walter Mikelson
William H. Janssen
by Robert A. Lavender
Their Attorney.

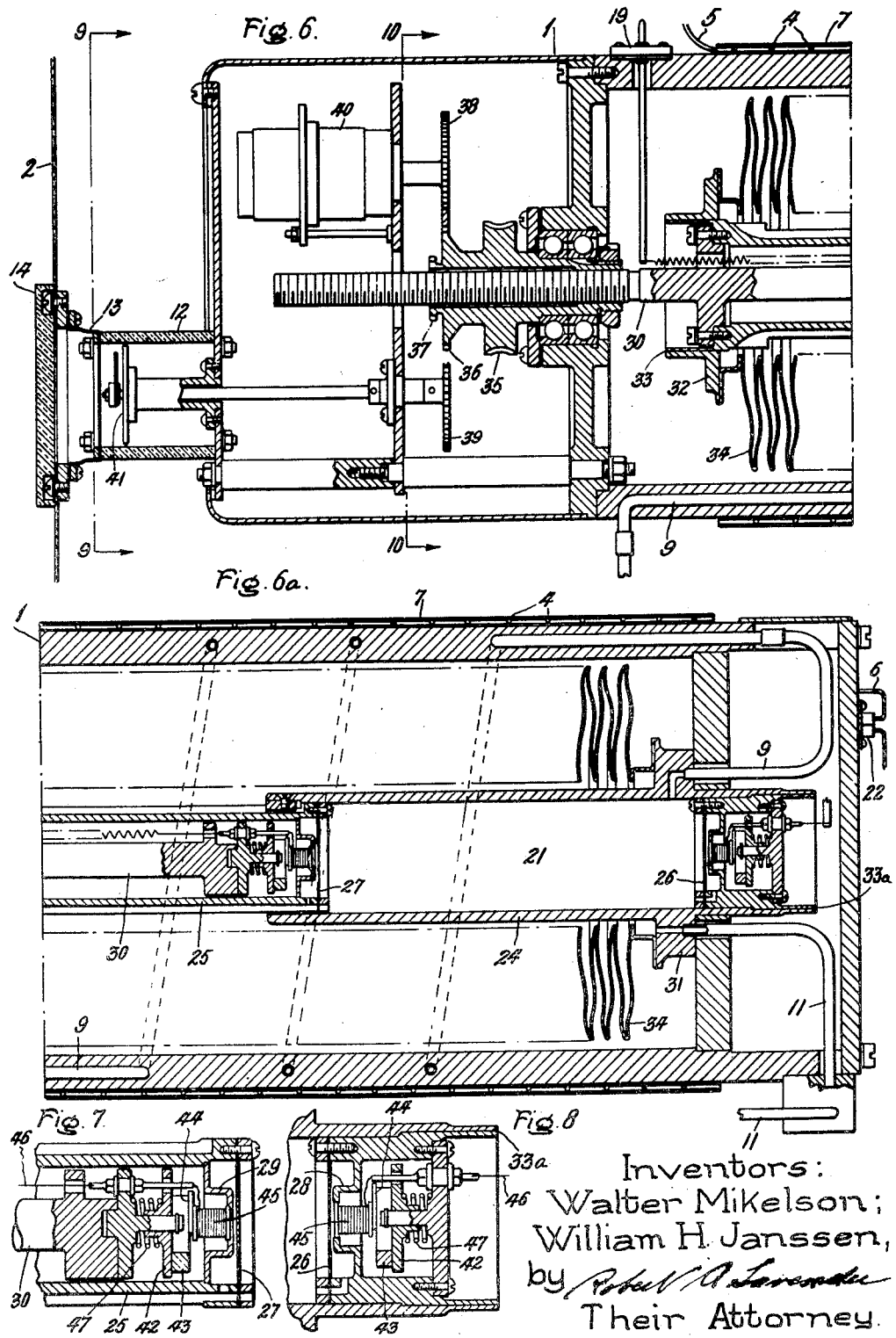

Sept. 5, 1950 W. H. JANSSEN ET AL 2,521,634
ACOUSTIC CHAMBER FOR ANALYSIS OF GASEOUS MIXTURES
Filed March 4, 1947 3 Sheets-Sheet 3

Inventors:
Walter Mikelson
William H. Janssen
by Robert A. Lounder
Their Attorney.

Patented Sept. 5, 1950

2,521,634

UNITED STATES PATENT OFFICE 2,521,634

ACOUSTIC CHAMBER FOR ANALYSIS OF GASEOUS MIXTURES

William H. Janssen and Walter Mikelson, Schenectady, N. Y., assignors, by mesne assignments, to the United States of America, as represented by the United States Atomic Energy Commission Application March 4, 1947, Serial No. 732,246

4 Claims. (Cl. 73—24)

Our invention relates to apparatus for determining acoustically the effective molecular weight of gaseous mixtures, and more particularly to an improved acoustic chamber for such apparatus for making such determinations in gaseous mixtures including highly corrosive components.

The molecular weight of a substance, whether in gaseous, liquid or solid state, is defined as the sum of the atomic weights of the atoms which make up one molecule. Thus the molecular weight of hydrogen is 2.0158 and that of oxygen is 32.

It is known that the number of molecules in a given volume of gas at a chosen pressure and temperature is the same for any gas, or for any mixture of two or more gases at these chosen conditions. Thus, the effective molecular weight of a gaseous mixture may be found if the types and percentages of the gases present are determinable. For gaseous mixtures containing two gaseous components, this may be expressed mathematically as follows:

(1) $$M = V_1 M_1 + V_2 M_2$$

where $M_1$ and $M_2$ are respectively the molecular weights of the two components, and $V_1$ and $V_2$ are the fractional volumes of the gases respectively. As an example, the effective molecular weight of a gas possessing equal numbers of hydrogen and oxygen molecules is 17.0078. Conversely, the percentage of each of the two gases in a gaseous mixture may be determined if the effective molecular weight of the mixture containing only these two gases is known.

The velocity at which sound waves travel through a gas is known to depend on the following factors, namely, molecular weight, temperature, and specific heat ratio of the gaseous mixture. Consequently, the natural or resonant frequency of an acoustic resonating chamber containing a gaseous mixture is a function of the physical dimensions of the resonating chamber and of the characteristics of the gaseous mixture. For gaseous mixtures obeying the "perfect gas" law, the above relationships may be expressed mathematically as follows:

(2) $$f = K\sqrt{\frac{RCT}{M}}$$

where $f$ is the natural or resonant frequency of the acoustic chamber,
K is a constant depending on the dimensions of the acoustic chamber,
R is the universal gas constant whose value is 8.313 ergs per degree C. per mole,
T is the absolute temperature of the gas in degrees Kelvin,
M is the effective molecular weight of the gaseous mixture, and
C is the specific heat ratio of the gaseous mixture which may be calculated as follows:

(3) $$C = \frac{V_1 M_1 C_{P_1} + V_2 M_2 C_{P_2}}{V_1 M_1 C_{V_1} + V_2 M_2 C_{V_2}}$$

where $C_{P_1}$, $C_{P_2}$, $C_{V_1}$ and $C_{V_2}$ are respectively the specific heats at constant pressure and at constant volume of the two gas components.

These relationships may be utilized in determining the percentage of each of any two known gases in a gaseous mixture, containing only the two known gases, by measuring the natural frequency of an acoustic resonating chamber of known dimensions while containing the gaseous mixture under consideration. If such measurements are made while the temperature is maintained constant, it is apparent that the resonant frequency is a function of only the effective molecular weight and specific heat ratio of the mixture.

The procedure may be simplified by calculating for an assumed constant temperature the resulting resonant frequency at each of various assumed values of $V_1$ and $V_2$, thereby obtaining values for a calibration curve from which $V_1$ and $V_2$ may be found directly for any measured resonant frequency. Thus, in measuring the components in any gaseous mixture of two known gases, it is only necessary to obtain a reading of the resonant frequency of the acoustic chamber when containing the mixture under consideration, and obtaining $V_1$ and $V_2$ from that calibration curve constructed for the gaseous mixture under consideration.

Means for determining the molecular weight of gases are known. One such means is represented in Patent No. 2,283,750 issued to Walter Mikelson on May 19, 1942. However, in dealing with gases containing corrosive components it is desirable that means be provided whereby the corrosive gas be confined in a gas-tight chamber, thereby preventing action by it upon the operative elements of the device.

It is an object of our invention to provide an acoustic chamber for measuring the effective molecular weight of a gaseous mixture whereby possible corrosive influences of the gas are minimized.

Another object of our invention is to provide an acoustic chamber for measuring the effective molecular weight of gases wherein inaccuracies in measured values, as caused by temperature changes, are minimized.

Figure 11:
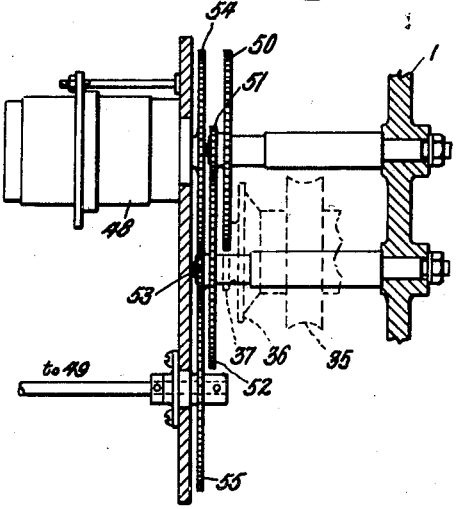
Figure 10:
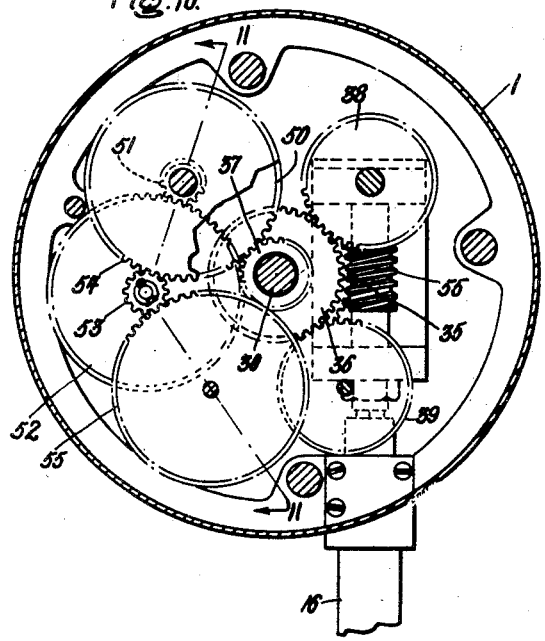

The features of the invention which are believed to be novel and patentable will be pointed out in the claims appended hereto. For a better understanding of our invention, reference is made in the following description to the accompanying drawings wherein Fig. 1 is a partially cutaway side view of a preferred embodiment of our invention; Fig. 2 is a left hand end view of the embodiment shown in Fig. 1; Fig. 3 is a partially cut-away cross sectional view taken on the line 3—3 of Fig. 1; Fig. 4 is a cross sectional view of one of the supports shown in Fig. 1 taken on the line 4—4; Fig. 5 is a cross sectional view on the line 5—5 of Fig. 3 showing a thermostatic control element; Fig. 6 and Fig. 6a are cross sectional views on line 6—6 of Fig. 9 of the resonant chamber assembly; Fig. 7 is an enlarged view of the receiver element shown in Fig. 6a; Fig. 8 is an enlarged view of the transmitter element shown in Fig. 6a; Fig. 9 is a view taken along the line 9—9 of Fig. 6; Fig. 10 is a partially cut-away view taken along the line 10—10 of Fig. 6, and Fig. 11 is a view taken along the line 11—11 of Fig. 10.

Referring to Fig. 1, the resonating chamber assembly and adjusting mechanism therefor, which are shown in Figs. 6 and 6a are contained in and supported by an enclosing casing 1. Casing 1 is, in turn, mounted within a box-like enclosing shield 2 and supported therein by four spring suspension supports 3, one of which is shown in cross section in Fig. 4. Enclosing shield 2 and springs 3 prevent surrounding temperature, noise and vibration conditions from adversely affecting the resonating chamber assembly. Such shielding action is preferably made more complete by filling the spaces between casing 1 and shield 2 with loosely packed insulating material. A heating coil 4 with terminals 5 and 6 is wound about that portion of casing 1 which contains the resonating chamber. A cylindrical insulating shield 7 is placed over the wound heating coil 4.

The gaseous mixture to be analyzed may be introduced into the resonating chamber through a pipe 8 joined to tubing 9. Tubing 9 is provided with a coiled portion so as to allow flexibility between casing 1 and pipe 8. A return or outlet pipe 10 joined to tubing 11 is provided for return of the gaseous mixture to the system from which the gaseous sample was taken. Tubing 11 is similarly provided with a coiled portion to allow flexibility.

On one end of casing 1 a rectangular collar 12 is provided which extends outwardly toward a rectangular opening in one wall of casing 2. A flexible sleeve or collar 13 is fitted to the wall of casing 2 about the opening therein and to collar 12. A transparent plate 14 covers the opening in casing 2. By this means the indicators, to be described later, placed within the collar 12 are visible from the exterior of casing 2.

To operate the adjusting mechanism contained within casing 1, a motor 15 is exteriorly mounted on casing 2 with its drive shaft extending inwardly toward casing 1. A flexible sleeve 16 serving as a shaft tunnel and a collar 17 are provided between casing 1 and casing 2. Flexible sleeves 13 and 16, the coiled portions in tubes 9 and 11 and the spring supports 3 cooperate to prevent extraneous shocks and audio frequency disturbances from affecting the operation of the audio system contained within casing 1. Conventional supports 18 are provided for the complete assembly. Double-conductor terminal blocks 19 and 20 are provided on casing 1 for purposes to be described.

In Fig. 2 an end view of the apparatus is shown wherein like reference numerals are used to describe corresponding elements.

In Fig. 3 a cross sectional view of the apparatus of Fig. 1, taken on the line 3—3, is shown. Similar reference characters refer to corresponding parts of Fig. 1. One end of the resonating chamber 21 is visible in this view. A double-conductor terminal block 22 is provided for connection to a thermostatic control 23 which is more fully illustrated in the cross sectional view of Fig. 5, taken along the line 5—5 of Fig. 3.

In Figs. 6 and 6a a cross sectional view of casing 1 and its concentrically positioned contents is shown. It will be understood that Fig. 6a is a continuation of Fig. 6. The resonating chamber 21, into which the gaseous mixture is placed for the transmission of sound waves therethrough, is formed by a hollow cylinder 24 mounted in fixed relation to casing 1 and essentially closed near one end by a flexible diaphragm 26, and at the other end by a flexible diaphragm 27 which is mounted upon the end of a hollow piston 25. While the volume of the resonating chamber may be defined as just described, the gaseous mixture is allowed to pass behind diaphragm 26 to the non-magnetic gas-tight member 28 through an opening in diaphragm 26 near its periphery as shown. Similarly, the gaseous mixture is allowed to pass behind diaphragm 27 but is prevented from escaping through the hollow piston 25 by a non-magnetic gas-tight member 29. By using such an arrangement, any possible static pressure differential across either diaphragm is prevented. To the right of member 28 and protected from the gaseous mixture by member 28, a transmitter mechanism, described in connection with Fig. 8, is placed as shown. Similarly, a receiver mechanism to the left of member 29 is held in the position shown by a shaft 30 extending inwardly through the hollow piston 25 and affixed to the left end thereof as shown in Fig. 6.

Gas-tight integrity of the resonating chamber assembly is obtained by providing a collar 31 near one end of cylinder 24 and integral therewith, a collar 32 at the left end of hollow piston 25 and affixed thereto as by a circular weld at 33, and a continuous metal bellows 34 attached at its open ends to collars 31 and 32. The transmitter assembly inserted into cylinder 24 may be similarly sealed as by a circular weld at 33a.

The gaseous mixture in its inward flow passes through tubing 9, a coil section of which is embedded in the walls of casing 1 and thence into the chamber 21. A return path is provided through the previously mentioned opening in diaphragm 27 near its periphery, thence into the metal bellows 34 and out through an opening in flange 31 to which tubing 11 is connected.

The resonator chamber is made adjustable in size in the following manner: Shaft 30, which extends inwardly into hollow piston 25 to support the receiver mechanism, also has a threaded portion extending outwardly through a gear 35 whose axial bore is similarly threaded and which is appropriately rotatably fixed with respect to casing 1. Rotation of gear 35 causes motion of piston 25 with respect to cylinder 24, thereby allowing adjustment of the length of chamber 21. Gas-tight integrity is maintained since bellows 34 is appropriately flexible with respect to such movement.

External indication of the size of the resonator assembly is accomplished as follows: Gear 35 also possesses gears 36 and 37 integral therewith. In mesh with gear 36, gears 38 and 39 are provided, gear 38 being mounted on the shaft of a Selsyn transmitter 40, and gear 39 mounted on the shaft of the local indicator 41. By this means either local or remote indication of the position of piston 25 is made available. The gear train enmeshed with gear 37 is better described by reference to Fig. 10.

The transmitter and receiver mechanisms disclosed in cross section in Figs. 7 and 8 are essentially identical and may be described as follows: A plate 42 carries a permanent horseshoe magnet 43. A pole piece 44 extends inwardly from one pole of magnet 43 thence at right angles to itself into a coil 45. Since a cross sectional view is shown, it should be remembered that a similar pole piece and coil are employed with respect to the second pole of the horseshoe magnet 43. The magnetic circuit, therefore, extends from one pole of magnet 43, through pole piece 44, through the center of coil 45, through the air gap necessitated by the non-magnetic member 29, through the magnetic diaphragm 27, and back through a second coil and pole piece (not shown) to the opposite pole of magnet 43. The two coils are placed in proper series relationship and two energizing leads, only one of which is shown at 46, are brought out to terminal blocks 19 and 20, respectively. The pole pieces extending through the coils are maintained in contact with members 28 and 29, respectively, by a spring 47 which urges mounting plate 42 toward said members. While we have shown diaphragms 26 and 27 as flat disks of magnetic material, it will be understood that nonmagnetic members of any desired configuration may also be used when provided with attachments of conventional type which possess magnetic properties.

In Fig. 9 a second Selsyn transmitter 48 and a second indicator 49 are shown. These devices are actuated by a gear train enmeshed with gear 37, as illustrated in Figs. 10 and 11. A rotatable member comprising gears 50 and 51 is mounted within casing I so as to allow gear 50 to enmesh with gear 37. A similar member comprising gears 52 and 53 is rotatably mounted within casing I with gear 52 in mesh with gear 51. The shaft of Selsyn transmitter 48 carries a gear 54 and transmitter 48 is so positioned such that gear 54 is in mesh with gear 53. Similarly, gear 55 on the shaft of indicator 49 also enmeshes gear 53. By such a gear reduction train, indicator 49 may be caused to rotate at a suitable ratio with respect to indicator 41 to indicate the length of the resonator chamber accurately. Gear 35 may be rotated by the motor 15 through a worm gear 55 enmeshed with gear 35, which worm gear is attached to the rotor of motor 15 through a flexible coupling.

The apparatus may be utilized in the following manner: The voltage output of the receiver mechanism resulting from vibration of diaphragm 27 may be applied to the input terminals of an amplifier of conventional type. The resulting voltage output of the amplifier is applied to the input terminals of the transmitter mechanism associated with diaphragm 26. It is preferable to utilize phase shifting means at any appropriate point in the circuit between the receiver and transmitter mechanisms whereby proper phase relationships, of a nature to be described, may be obtained. The voltage output of the amplifier is also connected to appropriate frequency measuring means which may be of any type such as a beat frequency measuring device possessing a constant frequency oscillator.

The gaseous mixture to be analyzed is introduced into the resonating chamber 21 through tube 9 and is allowed to escape through an opening in diaphragm 27 near its periphery, thence to the outlet tube 11. The heat exchange relationship between the portion of tube 9 embedded within the walls of casing I and the electrical heating coil 4, which is thermostatically controlled by the thermostatic element 23, provides for proper temperature control of the gases within chamber 21. The desirability of such control is evident by reference to Equation 3 supra. Thus, the speed of propagation of sound waves within chamber 21 becomes essentially independent of all factors save the effective molecular weight and specific heat ratio of the gaseous mixture contained within the resonating chamber.

If the amplifier is suitably energized any slight vibration of diaphragm 27, such as may be caused by turbulence in the gaseous mixture within chamber 21 or by a transient mechanical shock of the chamber assembly, will cause an even greater and like vibration of diaphragm 26. Thus, a pressure or sound wave will be transmitted through the gaseous mixture travelling from diaphragm 26 to diaphragm 27 and be reflected back to diaphragm 26.

Since the reflected pressure wave may be met by other pressure waves originating at diaphragm 26 and reinforcement or cancellation of these waves will occur in a manner dependent upon the length of the resonating chamber and the frequency at which they are produced, it will be found that the frequency of the vibrations set up within the resonating chamber will be such that the resonating chamber acts as a half-wave resonator or some integral multiple thereof. Thus, the receiver mechanism, and therefore the transmitter mechanism as well, will be vibrated at essentially a single frequency whose value is dependent upon the length of the resonating chamber and the velocity of wave propagation through the gaseous mixture therein. Furthermore, the phase relationship of the mechanical vibrations in diaphragms 26 and 27 will be essentially 180° out of phase since the resonating chamber is one-half wavelength long or some multiple thereof. Thus it is desirable to insure a 180° phase relationship between the input and output voltages of the amplifier; this may be accomplished by appropriate adjustment of the phase shifter previously referred to.

As is well known, a mechanical vibrating system, such as a diaphragm, has a resonant frequency of its own. To prevent the inherent resonant frequencies of diaphragms 26 and 27, respectively, from affecting the frequency at which the resonator assembly will operate, it is preferable to employ diaphragms of different natural resonant frequencies, one of which is below the expected operating frequency of the assembly and the other above such operating frequency. It can be shown that a mechanical diaphragm vibrating below its natural or resonant frequency is equivalent in action to that of a restoring spring which returns energy to the system causing it to vibrate, while when vibrating above its natural or resonant frequency it is equivalent to that of a weight or mass which must be driven back and forth. In addition, the gas column itself has equivalent driven mass and restoring spring characteristics similar to those of a vibrating diaphragm. However, in the case of a gas column, the equivalent value of each such characteristic is dependent upon the pressure to which the gas is subjected. By properly considering these factors as interrelated in a resonating gas chamber possessing vibratory diaphragms near each end thereof, it has been found that the resonant frequency of the assembly may be made to remain essentially independent of gas pressure and diaphragm resonant frequency effects if one diaphragm has a chosen resonant frequency above the frequency range to be utilized in the gas chamber and the other diaphragm has a chosen resonant frequency below such frequency range. I have employed a diaphragm whose resonant frequency was approximately 600 cycles per second for the receiver diaphragm and one possessing a resonant frequency of essentially 1150 cycles per second for the transmitter diaphragm while operating a resonating chamber at or within a range of frequencies from 800 to 960 cycles per second. It should be noted that the operating frequency is not only different from either resonant frequency but is also different from the second and third harmonic of the lower resonant frequency.

Such an arrangement is found to possess the following desirable features; more uniform sensitivity of the acoustic resonator over the operating range, inappreciable frequency error due to pressure changes of the gaseous mixture, and small probability that the resonator will oscillate at the resonant frequency of one of the diaphragms instead of at the frequency dependent upon the gaseous mixture contained within the resonator.

The size of the resonant chamber was made adjustable as to length in order to allow the operating frequency of the resonator assembly to remain within the desired range even though gases of greatly varying effective molecular weight are to be analyzed. If a gas such as essentially pure hydrogen fills the resonating chamber, the velocity of wave propagation is high because of the low molecular weight of hydrogen, and the chamber must be correspondingly lengthened if the assembly is to resonate within the desired range of frequencies. Conversely, analysis of a gas whose molecular weight is near that of oxygen requires the length of the resonating chamber to be greatly decreased. Such adjustment in length of the resonating chamber is desirable since the frequency at which the amplifier of resonating chamber is operating may be more accurately measured by a device designed to measure frequencies over a relatively small range of frequencies than would be possible if all frequencies resulting from a fixed length resonating chamber were required to be measured. Furthermore, the undesirable effects of the mechanical resonant frequency characteristics of the diaphragms would be introduced at some portions of the longer operating frequency range necessarily resulting if a chamber of fixed length were employed. A convenient manner of operating the apparatus is to select a number of resonant chamber lengths, ten for example, and prepare a calibration as a function of frequency at each length selected. In this way the frequency range which must be employed can be kept small.

Desired measurements are obtained by determining the frequency at which the amplifier is oscillating and noting the length of the resonating chamber as indicated by dials 41 and 49, respectively. It is also possible to employ a constant frequency oscillator beating against the amplifier oscillations and to utilize the resulting beat frequency to control a servo mechanism which will adjust the length of the resonating chamber to a condition of zero beat frequency. If such a method is used, the desired information concerning the gaseous mixture is completely contained in the reading of the length of the resonating chamber, interpreted in accordance with a previous prepared calibration curve; since the operating frequency of the resonating chamber is equal to the constant frequency of the controlled oscillator.

Since the gaseous mixture is allowed to occupy the space between diaphragm 27 and member 29 and the space between diaphragm 26 and the member 28, the equivalent length of chamber 21 somewhat exceeds the distance from diaphragm 26 to diaphragm 27. It has been found that this equivalent length is not wholly independent of the pressure of the gases within chamber 21; however, it has been found that this pressure effect is of only slight magnitude because diaphragms were selected one above and the other below the operating frequency range and the apparatus functions properly through a wide range of pressures. Since sound waves must have a medium through which to travel, a lower limit of pressure near one pound per square inch is indicated since sufficient coupling between the two diaphragms is not insured if pressures below one pound per square inch are used.

It is apparent that the gaseous mixtures come in contact with no part of the operating mechanism except diaphragms 26 and 27, which diaphragms may be constructed of material resistant to corrosion to the same extent as the remainder of the resonating chamber. While I have designed an acoustic chamber particularly suited for use with corrosive gases, its use for any gaseous mixture is apparent.

As will occur to those skilled in the art, various different arrangements and combinations of the principles described above may be employed without departing from the true spirit and scope of the invention and we, therefore, do not wish to limit our invention to the particular arrangement described.

What we claim as new and desire to secure by Letters Patent of the United States is:

1. In combination, a gas-tight acoustic chamber possessing at least one access opening in a wall thereof, said chamber including an inner resonant chamber having telescoping sections for adjusting its length and a gas-tight bellows surrounding the resonant chamber, vibratory diaphragms mounted in opposed relation within said chamber near opposite ends thereof, receiver means exteriorly adjacent said chamber adapted to be responsive to mechanical vibrations of one of said vibratory diaphragms, transmitter means exteriorly adjacent said chamber adapted to cause mechanical vibrations in the second of said vibratory diaphragms, and means for introducing into said chamber a gaseous mixture to be analyzed.

2. In combination, a gas-tight chamber possessing at least one access opening in a wall thereof and having at least two opposite walls with portions thereof constructed of nonmagnetic material, vibratory diaphragms of magnetic material mounted within said chamber adjacent said opposing walls containing nonmagnetic portions, the spaces on both sides of said diaphragms being interconnected, receiver means exteriorly adjacent one of said opposing walls adapted to convert mechanical vibrations of one of said diaphragms into corresponding electrical impulses, transmitter means exteriorly adjacent the other of said opposing walls adapted to cause the second of said diaphragms to vibrate in correspondence with electrical impulses received by said transmitter means, and means for introducing into said chamber a gaseous mixture to be analyzed.

3. In combination, a gas-tight chamber possessing at least one access opening in a wall thereof adapted for introduction of a gaseous mixture into said chamber and having opposite ends adapted to be separated by a column of such gaseous mixture of such length as to possess a natural resonant frequency of a chosen value, first and second vibratory diaphragms mounted in opposed relation within said chamber near said opposite ends thereof, said first diaphragm having a natural resonant frequency less than said chosen frequency value and said second diaphragm having a natural resonant frequency greater than said chosen frequency value, receiver means exteriorly adjacent said chamber adapted to be responsive to mechanical vibrations of one of said vibratory diaphragms, and transmitter means exteriorly adjacent said chamber adapted to cause mechanical vibrations in the other of said vibratory diaphragms.

4. In combination, a gas-tight chamber adapted for circulation of a gaseous mixture therein by means of an inlet and an outlet opening in a wall thereof and having at least two opposite walls with portions thereof constructed of nonmagnetic material, said walls adapted to be adjustable as to spacing therebetween, means for adjustably fixing the spacing between said opposite walls of said chamber, means exterior of said chamber for indicating said spacing, vibratory diaphragms of magnetic material mounted within said chamber adjacent said opposing walls containing nonmagnetic portions, receiver means exteriorly adjacent one of said opposing walls adapted to convert mechanical vibrations of one of said diaphragms into corresponding electrical impulses, transmitter means exteriorly adjacent the other of said opposing walls adapted to cause the second of said diaphragms to vibrate in correspondence with electrical impulses received by said transmitter means, including a thermostat and a heating coil about the walls of said chamber and means for maintaining said chamber including its contents at an essentially constant temperature.

WILLIAM H. JANSSEN.
WALTER MIKELSON.

REFERENCES CITED

The following references are of record in the file of this patent:

UNITED STATES PATENTS

| Number | Name | Date |
|---|---|---|
| 1,528,586 | Tate | Mar. 3, 1925 |
| 1,570,781 | Ruben | Jan. 26, 1926 |
| 1,945,736 | De Giers | Feb. 6, 1934 |
| 2,154,862 | Olshevsky | Apr. 18, 1939 |

FOREIGN PATENTS

| Number | Country | Date |
|---|---|---|
| 654,673 | Germany | Dec. 15, 1935 |

OTHER REFERENCES

Text, Sound Waves and Acoustics, M. Y. Colby, copywright 1938. Published by Henry Holt and Co., N. Y. (Copy in Div. 36, page 233.)